United States Patent
Turbin

(10) Patent No.: US 8,677,491 B2
(45) Date of Patent: Mar. 18, 2014

(54) MALWARE DETECTION

(75) Inventor: Pavel Turbin, Tuusula (FI)

(73) Assignee: F-Secure Oyj, Helsinki (FI)

( * ) Notice: Subject to any disclaimer, the term of this patent is extended or adjusted under 35 U.S.C. 154(b) by 700 days.

(21) Appl. No.: 12/658,188

(22) Filed: Feb. 4, 2010

(65) Prior Publication Data

US 2011/0191850 A1  Aug. 4, 2011

(51) Int. Cl.
| | |
|---|---|
| *G06F 11/30* | (2006.01) |
| *G06F 12/14* | (2006.01) |
| *G06F 21/56* | (2013.01) |
| *G06F 21/55* | (2013.01) |
| *G06F 21/62* | (2013.01) |
| G06F 12/16 | (2006.01) |
| G08B 23/00 | (2006.01) |
| G06F 21/51 | (2013.01) |
| G06F 9/44 | (2006.01) |
| G06F 21/12 | (2013.01) |
| G06F 17/30 | (2006.01) |

(52) U.S. Cl.
CPC ............ *G06F 21/566* (2013.01); *G06F 21/56* (2013.01); *G06F 21/554* (2013.01); *G06F 21/568* (2013.01); *G06F 21/6281* (2013.01); *G06F 21/561* (2013.01); *G06F 21/51* (2013.01); *G06F 9/4406* (2013.01); *G06F 21/121* (2013.01); *G06F 9/442* (2013.01); *G06F 17/30117* (2013.01)
USPC .............................. 726/24; 726/22; 713/188

(58) Field of Classification Search
CPC ..... G06F 21/56; G06F 21/566; G06F 21/554; G06F 21/564; G06F 21/51; G06F 21/568; G06F 9/4406; G06F 21/6281; G06F 21/121; G06F 21/561; G06F 2221/034; G06F 9/442; G06F 17/30117
USPC ...................................... 726/22, 24; 713/188
See application file for complete search history.

(56) References Cited

U.S. PATENT DOCUMENTS

| | | | | |
|---|---|---|---|---|
| 7,448,084 | B1 * | 11/2008 | Apap et al. ...................... | 726/24 |
| 7,565,686 | B1 * | 7/2009 | Sobel et al. ....................... | 726/2 |
| 7,631,357 | B1 * | 12/2009 | Stringham ...................... | 726/24 |
| 7,765,592 | B2 * | 7/2010 | Wang et al. ..................... | 726/22 |
| 7,921,461 | B1 * | 4/2011 | Golchikov et al. ............. | 726/23 |
| 7,984,503 | B2 * | 7/2011 | Edwards ......................... | 726/24 |
| 8,099,785 | B1 * | 1/2012 | Pavlyushchik ................. | 726/24 |

(Continued)

OTHER PUBLICATIONS

Apap, Frank et al. "Detecting Malicious Software by Monitoring Anomalous Windows Registry Accesses", LNCS 2516, 2002.*

(Continued)

*Primary Examiner* — Michael Simitoski
(74) *Attorney, Agent, or Firm* — Harrington & Smith

(57) ABSTRACT

According to a first aspect of the present invention there is provided a method of operating a computer to detect malware, which malware writes a copy of an executable file to a non-volatile memory of the computer and creates a launch point that causes that executable file to be run at start-up of the computer. The method includes, during the shutdown procedures of the computer, monitoring the creation and/or modification of any launch points and, for any such modification or creation, saving a further copy of any executable file associated with the launch point to the non-volatile memory, and, following a subsequent start-up of the computer, examining said further copy to determine if it is potential malware.

12 Claims, 2 Drawing Sheets

(56) References Cited

U.S. PATENT DOCUMENTS

| | | | |
|---|---|---|---|
| 8,161,548 B1* | 4/2012 | Wan | 726/22 |
| 2005/0216749 A1* | 9/2005 | Brent | 713/188 |
| 2006/0005244 A1* | 1/2006 | Garbow et al. | 726/24 |
| 2006/0265761 A1* | 11/2006 | Rochette et al. | 726/27 |
| 2006/0288416 A1* | 12/2006 | Costea et al. | 726/24 |
| 2007/0006310 A1* | 1/2007 | Piccard | 726/24 |
| 2007/0289019 A1* | 12/2007 | Lowrey | 726/24 |
| 2010/0077481 A1* | 3/2010 | Polyakov et al. | 726/24 |

OTHER PUBLICATIONS

Chien, Eric. "Techniques of Adware and Spyware", 2005.*
Gostev, Aleksandr. "Statistics 2008 Kaspersky Security Bulletin", 2009.*
Microsoft. "Application Power Management Best Practices for Windows Vista", Nov. 2007.*

* cited by examiner

MALWARE DETECTION

TECHNICAL FIELD

The present invention relates to a method of detecting potential malware programs.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software.

When a device is infected by malware program the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a device, it may be performing other malicious functions such as monitoring and stealing potentially valuable commercial, personal and/or financial information, or hijacking a device so that it may be exploited for some illegitimate purpose.

Many end users make use of anti-virus software to detect and possibly remove malware. However, in order to hide the presence of malware from end users and to evade detection by anti-virus software, malware authors try to hide their malware by designing it to mask or disguise itself as legitimate processes running on the computer. The malware achieves this by injecting its executable code into another process running on the computer, the target process then blindly executes this malware code effectively concealing the source of the malicious behaviour.

Computers are particularly vulnerable to such actions during the moments early in the start-up procedures and late in the shutdown procedures, as usually neither the user nor any anti-virus software are operating during these periods. Some malware programs are therefore designed to run as early as possible during the start-up procedures of the computer. They can then inject themselves into one of the running processes that have been loaded onto the computer's RAM, before removing almost all references and traces of the malware from system, such as the original start-up files on the hard disk and any launch point (usually, an entry in the registry) that caused the start-up files to run automatically, keeping only the run-time code inside of target process. This makes it more difficult to detect and remove such malware programs once the anti-virus software is active.

Typically, the shutdown of a computer system causes all services, including those provided by anti-virus software, to stop any activity. However, there is still a short period during which the malware can set itself to run once the computer is rebooted. As such, these malware programs are further designed to re-write themselves onto the hard disk and re-create their launch points to ensure that they will run the next time the computer is started.

An example of a malware program that is designed in this way is the Bandok (aka BackDoor-CSN, Bandook) trojan, which creates a RunOnce registry key in the registry as its launch point. When executed, this trojan injects its code into other running processes, such as explorer.exe, and the targeted process then executes this code creating a watchdog thread. The RunOnce registry key is then automatically removed by Windows™ after execution of the Trojan, and the malware program file is removed from the hard disk. When the computer system is subsequently shutdown, the malware restores the RunOnce registry key and recreates its start-up file on the hard disk from the memory of the target process (i.e. explorer.exe). This process of writing into the registry and onto the hard disk occurs during the shutdown of the infected computer system, when most anti-virus monitoring has been deactivated. As such, the malware can successfully re-establish itself to be executed during the next system restart.

The Brontok worm also displays similar behaviour. This malware program is designed to cause an infected computer system to reboot each time it notices an attempt to remove it, either manually or by anti-virus software. In doing so, this malware program relies on the fact that the protection provided by anti-virus will usually stop as soon as shutdown of the computer system is initiated. As such, rebooting is used by this malware as a way to disable the anti-virus software, whilst still providing enough time for the malware to re-create any components that it requires to ensure that it is run when the system restarts.

FIG. 1 is a flow diagram further illustrating the process implemented by malware that attempts to hide its presence in this way. The steps performed are as follows:

A1. Start-up of an infected computer system is initiated (i.e. either by the user or as part of a re-start procedure).

A2. A launch point installed by the malware causes the malware program/executable file installed on the hard disk to be run.

A3. The malware then injects its run-time code into a legitimate running process, deletes its start-up executable files from the hard disk, and deletes its launch point.

A4. Any anti-virus program that is installed on the computer is then activated.

A5. During the running of the computer system the anti-virus fails to detect the presence of the malware infection as it is well hidden within the legitimate running processes, and both its image on the hard disk and its launch point have been deleted.

A6. Shutdown of the computer system is then initiated, and the anti-virus program is deactivated.

A7. The malware run-time code within the running processes is aware that shutdown has been initiated, and therefore re-creates its launch point and restores its start-up code on to the hard disk, ready to be run once the computer is re-started.

A8. The computer system then shuts down.

SUMMARY

It is an object of the present invention to provide a method of blocking and removing sophisticated malware whose start-up files are only present on the hard disk during the early stages of the computer's start-up procedures, before being deleted According to a first aspect of the present invention there is provided a method of operating a computer to detect malware, which malware writes a copy of an executable file to a non-volatile memory of the computer and creates a launch point that causes that executable file to be run at start-up of the computer. The method comprises, during the shutdown procedures of the computer, monitoring the creation and/or modification of any launch points and, for any such modification or creation, saving a further copy of any executable file associated with the launch point to the non-volatile memory, and, following a subsequent start-up of the computer, examining said further copy to determine if it is potential malware. The method may further comprise detecting initiation of the shutdown procedures of the computer, prior to monitoring the creation and/or modification of any launch points.

The copy of the executable file may be written to a first location in the non-volatile memory, whilst the further copy may then be saved to a second location in the non-volatile memory. The second location in the non-volatile memory may subsequently be accessed by a malware scanner, the malware scanner examining said further copy to determine if it is potential malware. Information identifying the associated launch point may also be saved with the further copy of the executable file. As an alternative, a further copy may only be saved if the executable file is written to the non-volatile memory during the shutdown procedures of the computer.

The step of monitoring the creation and/or modification of any launch points may comprises one or more of:
  monitoring changes to a registry of the computer;
  monitoring modifications to a boot sector of a non-volatile memory of the computer; and
  monitoring the writing of data to files.

The launch points that are monitored may comprise one or more of:
  an executable file specified under a Run or RunOnce key;
  an executable file specified to run as a system service or device driver;
  an executable file specified to run as a shell;
  an executable file specified to run as a debugger;
  an executable file specified to run as a Winlogon notification package;
  an executable file specified in the start-up folders; and
  an executable file specified to run as a boot-start driver.

The step of examining said further copy to determine if it is potential malware comprises one or more of:
  scanning the further copy for a malware signature; and
  performing heuristic analysis of the further copy.

The step of detecting initiation of shutdown procedures of the computer may comprise any one of using a user-mode driver to receive a SERVICE_CONTROL_POWEREVENT, a SERVICE_CONTROL_PRESHUTDOWN or a SERVICE_CONTROL_SHUTDOWN message, using a kernel-mode driver to receive a IRP_MJ_SHUTDOWN IRP message, or using an invisible window to receive a WM_QUIT message.

The method may further comprise, if a further copy of an executable file is determined to be malware, initiating a shutdown of the computer, and, during the shutdown procedures, deleting the created and/or modified launch point associated with the executable file and deleting the executable file from the non-volatile memory of the computer.

According to a second aspect of the present invention there is provided a computer system. The computer system comprises a shutdown scanner unit for monitoring the creation and/or modification of any launch points during the shutdown procedures of the computer system, a memory for saving a copy of any executable file associated with a launch point created and/or modified during the shutdown procedures, and a malware detection unit for examining said copy, following a subsequent start-up of the computer system, in order to determine if the executable file is potential malware.

According to a third aspect of the present invention there is provided a computer program. The computer program comprises computer program code means adapted to perform the steps as described above when said program is run on a computer.

According to a fourth aspect of the present invention there is provided the computer program as described above embodied on a computer readable medium.

DETAILED DESCRIPTION

In order to at least partially overcome some of the problems described above, it is proposed here to provide a shutdown scanner that can scan a computer system, during the late stages of its shutdown procedures, in order to identify the creation and/or modification of any program launch points. In doing so, this shutdown scanner can identify potential malware programs whose start-up files are only present on the hard disk during the early stages of the computer's start-up procedures, before being deleted.

It has been recognised that it is highly unusual for legitimate programs to create launch points during these late stages of a computer system shutdown. As such, by detecting the creation and/or modification of launch points during the late stages of a computer's shutdown procedures, this shutdown scanner can identify potential malware that is restoring those components it requires to ensure it is run during the next start-up of the computer. The program/executable files (e.g. binary files or script files) identified by or associated with any identified launch points can then be saved for scanning by a malware detection unit of an anti-virus program, in order to determine whether or not they do relate to malware. For those computer systems that are relatively free of malware infections, the malware detection unit will only be required to scan saved files infrequently, thereby ensuring that it has minimal performance impact.

Figure 1:
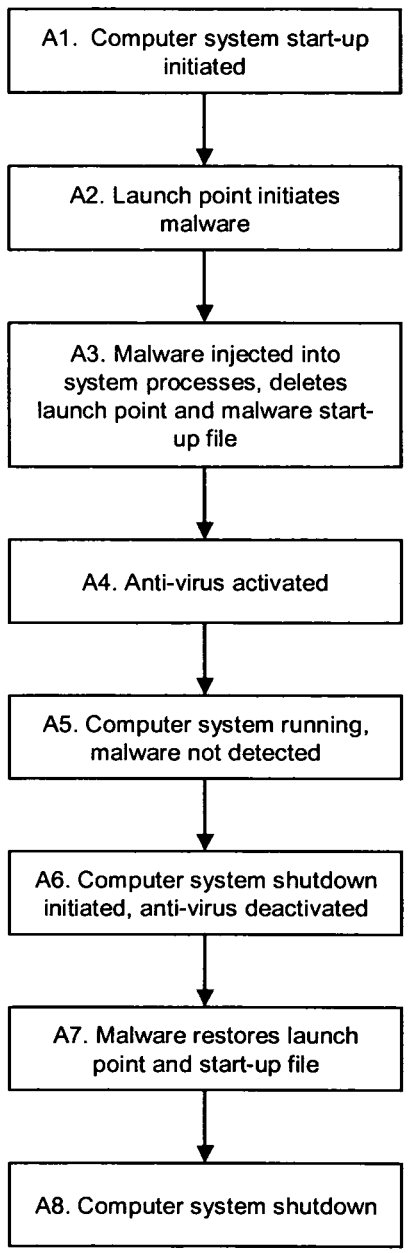
FIG. 1 is a flow diagram illustrating the process implemented by some malware.
Figure 2:
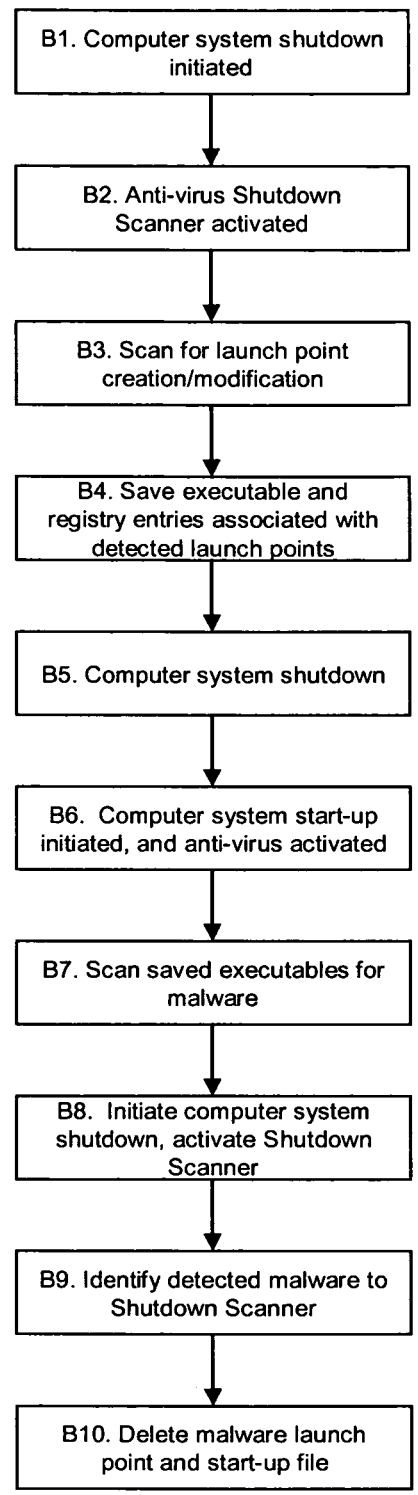
FIG. 2 illustrates schematically a computer system according to an embodiment of the present invention.

FIG. 2 illustrates schematically a computer system 1 according to an embodiment of the present invention. The computer system 1 can be implemented as a combination of computer hardware and software. The computer system 1 comprises a memory 2, a processor 3 and a transceiver 4. The memory 2 stores the various programs/executable files that are implemented by the processor 3, and also provides a storage unit 5 for any required data such as malware definition data and/or heuristic analysis rules. The programs/executable files stored in the memory 2, and implemented by the processor 3, include a shutdown scanner unit 6 and a malware detection unit 7. The shutdown scanner unit 6 and malware detection unit 7 can be sub-units of an anti-virus program 8. The transceiver 4 is used to communicate with a central anti-virus server 9 over a network 10 such as the Internet or a LAN. The central anti-virus server 9 is typically operated by the provider of the anti-virus program 8 that is run on the computer 1. Alternatively, the central anti-virus server 9 may be that of a network administrator or supervisor, the computer 1 being part of the network for which the supervisor is responsible. The central anti-virus server 9 comprises a database 10 for storing the latest malware definition data and/or heuristic analysis rules, and a transceiver 11 for communication with the computer 1 over the network 10.

The shutdown scanner unit 6, provided as part of the anti-virus program 8, is passive throughout most of the time the computer is running, and is therefore transparent to user activity and does not consume any resources. The shutdown scanner 6 is activated once a shutdown of the computer system 1 is initiated, and begins monitoring the activity of the computer system 1 during the shutdown procedures. The shutdown scanner 6 is configured to be active until as late as possible during shutdown. Ideally, the shutdown scanner unit 6 would be one of the last software components deactivated by the system.

Conventionally, once shutdown of a computer has been initiated, the programs/applications running on the computer will be notified and will begin deactivating all of their components. As such, anti-virus programs and their virus scanning functions will also be deactivated. This allows certain types of malware, as discussed above, to reinstall the components that they require in order to ensure they are run upon the next start-up of the computer, without being detected by such conventional anti-virus programs.

The shutdown scanner uses the same file system filter drivers and registry filter drivers as Windows® user mode. A filter driver receives notifications from other processes and drivers regarding events that occur in the system, such as when a process creates or opens a file. In using the filter drivers (file and registry filters) the shutdown scanner can be notified of all changes to files in the file system, and registry entries in the registry, that occur during the Windows® shutdown procedures and can identify any launch points. To do so, the shutdown scanner can use either an existing filter driver or a new filter driver developed for this specific purpose. However, conventional user mode drivers/processes, such as those of traditional anti-virus scanners, can be unloaded. In contrast, the shutdown scanner can not be unloaded. This means that the driver stays in the memory whilst Windows® is running. One possible way of preventing the shutdown scanner from being unloaded is to not specify an Unload callback routine, using the Driver_Unload function, during registration of the shutdown scanners filter driver.

Figure 3:
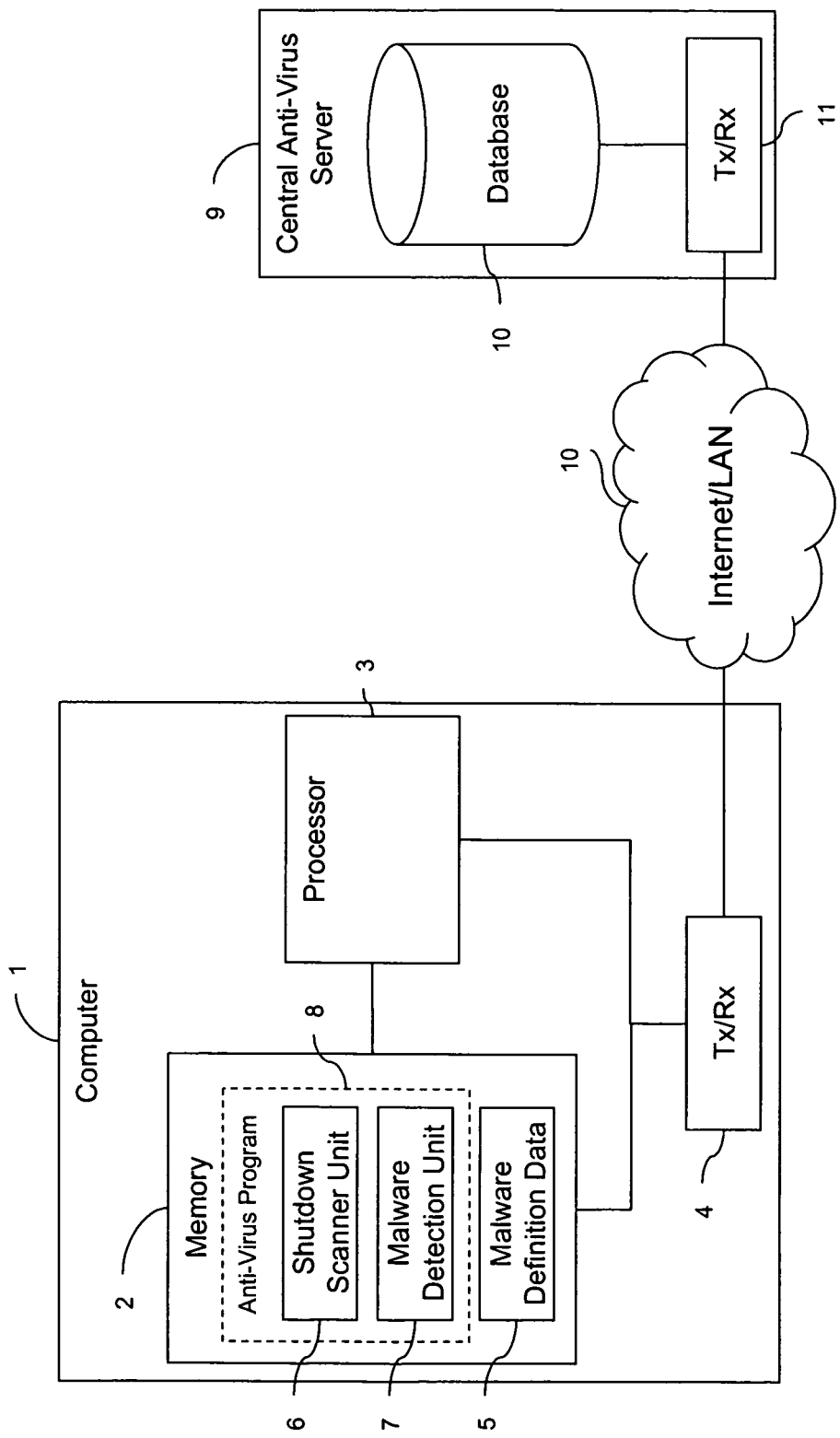
FIG. 3 is a flow diagram illustrating the process of detecting malware according to an embodiment of the present invention.

FIG. 3 is a flow diagram illustrating the process of detecting malware according to an embodiment of the present invention. The steps performed are as follows:

B1. The user or an application on the computer 1 initiates shutdown of the computer 1.

B2. The ant-virus program 8 determines that shutdown has been initiated, and the shutdown scanner unit 6 is activated.

B3. Once activated, the shutdown scanner unit 6 immediately begins monitoring the computer system 1 in order to detect the creation and/or modification of any application launch points. Typically, the shutdown scanner unit 6 would need to monitor the computer system for changes to the registry, modifications to the boot sector of the hard disk or any writing to files that occurs, in order to detect the creation or modification of any launch points.

B4. If the shutdown scanner unit 6 detects creation of a new launch point, it saves the executable/program file that would be run by the launch point, together with the launch point information, into a specified storage location (e.g. a file) in the memory 2. By saving a copy of the executable file to another location known to the anti-virus program 8, the shutdown scanner 6 ensures that there is a copy of the executable file available that can be scanned by the malware detection unit 7, even if the original copy of the executable file (i.e. the copy which the malware intends to run on start-up) is deleted from the hard disk during the computer's start-up procedures.

B5. All remaining programs/processes are then deactivated, including the anti-virus program 8 and the shutdown scanner 6, and the computer system 1 is shutdown.

B6. The computer system 1 is then re-started and the anti-virus program 8 is activated.

B7. The malware detection unit 7 of the anti-virus program 8 then scans the executable files saved in the specified storage, in order to determine if these files are malware or not. The malware detection unit 7 can use any one of a number or methods, or a combination of these methods in order to determine whether or not the executable file is malware. These methods may include fingerprint/signature detection or heuristic analysis.

B8. If the malware detection unit 7 determines that a saved executable file is malware then the anti-virus program 8 will attempt to disinfect the computer system 1. In order to disinfect the computer system 1, the anti-virus program 8 will initiate a shutdown of the computer system 1, thereby activating the shutdown scanner unit 6.

B9. The anti-virus program 8 identifies, to the shutdown scanner unit 6, which executable files have been determined to be malware, either immediately before or immediately after initiating a shutdown of the computer system 1. In order to identify which files should be deleted, the anti-virus program 8 can provide the shutdown scanner unit 6 with the hash of any executables that have been identified as malware. Alternatively, the anti-virus program 8 can provide the shutdown scanner unit 6 with information identifying the launch points associated with the malware. The shutdown scanner unit 6 can then locate the executable files from their launch points.

B10. As the shutdown of the computer system 1 progresses the malware will expose itself, enabling the shutdown scanner unit 6 to delete the executable files and launch points as soon as they are created by the malware.

There are a variety of ways in which the anti-virus program could determine that shutdown of the computer has been initiated. For example, the anti-virus program could be configured with a user-mode driver that handles messages such as the SERVICE_CONTROL_POWEREVENT, SERVICE_CONTROL_PRESHUTDOWN or SERVICE_CONTROL_SHUTDOWN messages, received from a service control manager (SCM), in order to receive a notification when shutdown of the computer system has been initiated. Alternatively, the anti-virus program could receive such a notification by making use of a kernel-mode driver that can register a callback, such as the loRegisterShutdownNotification routine, which registers the driver to receive an IRP_MJ_SHUTDOWN I/O request packet (IRP) from the I/O Manager when shutdown of the computer has been initiated. As a further alternative, the anti-virus program could be configured to make use of an invisible window that will receive the WM_QUIT message from the operating system when it is due to be terminated.

In addition, the application launch points that the shutdown scanner unit 6 will detect can include:

A program/executable file specified under a Run/RunOnce key in the Windows® registry. The Run/RunOnce keys in the HKEY_LOCAL_MACHINE hive of the Windows® registry specify programs/executable files that are to be run automatically. For example, programs/executable files specified under the HKLM\Software\Microsoft\Windows\CurrentVersion\Run registry key are run each time Windows® boots up. In contrast, programs/executable files specified under a RunOnce registry key are run the first time Windows® is started and then automatically deleted.

A system service or driver specified in the Windows® registry. The ImagePath value of the HKLM\SYSTEM\CurrentControlSet\Services subkey specifies a program/executable file to run as a system service or device driver.

A Shell value within the Winlogon registry key in the Windows® registry. The Shell value specifies a program/executable file to run as the user's shells or interface to the operating system and specifies "explorer.exe" by default. However, Windows® allows a custom shell program to be specified by inclusion of a shell registry value under the HKLM\SOFTWARE\Microsoft\Windows NT\CurrentVersion\Winlogon registry key. Malware can therefore register itself as the shell and, once activated can also start the default "explorer.exe". As a result both the malware and the default shell will be running, such that the malware is almost invisible.

A debugger string for a common/standard program (i.e. explorer.exe) specified in the Windows® registry. The HKLM\SOFTWARE\Microsoft\Windows NT\CurrentVersion\Image File Execution Options registry key is intended to enable a debugger to be specified, that will be started by Windows instead of the executable file specified in the subkey. By setting the value of the debugger string to the path of a malware executable file, the malware executable file will be run instead of the executable file (i.e. explorer.exe) specified in the subkey.

A Winlogon notification package in the Windows® registry. Winlogon is a component of the Windows operating system that provides interactive logon support. Winlogon notification packages are Dynamic Link Library (DLL) executable files that receive and handle events generated by Winlogon. To register a notification package, a registry key named Notify is created as a subkey of the HKLM\Software\Microsoft\Windows NT\CurrentVersion\Winlogon registry key and the name of the DLL is added as a value. However, some malware use this as a launch point for their executable DLL start-up file.

Any other registry entries that cause a program to run following start-up of the computer system.

A boot-start driver. A boot-start driver is the driver for a device that is required to start the computer, such as the drivers for the hard disk and for the file system.

A program/executable file specified in the start-up folders. These folders contain programs and applications that will be automatically executed at start-up of computer. Windows® operating systems usually provide a start-up folder that applies to all users of a computer, as well as start-up folders that apply to each individual user that logs in to the computer. Adding a file to one of these start-up folders enables the program/application to run automatically.

The method described above provides a method of detecting malware that attempts to hide or disguise its presence by ensuring that its components are only present on the hard disk and in the registry during start-up of a computer. This method ensures that these components, which would be deleted before traditional anti-virus processes are activated, can be detected and permanently deleted.

The embodiment above describes the shutdown scanner monitoring the computer system in order to detect the creation and/or modification of any application launch points during the shutdown procedures. However, this could be used merely as a 'fast mode' scan, requiring minimal processing and causing minimal performance impact. As such, the anti-virus program could also be configured to perform a 'slow mode' scan when required (e.g. in accordance with a predefined schedule, upon request by the user, or in response to a new threat). This 'slow mode' would involve the shutdown scanner identifying all launch points, not just those created and/or modified during the shutdown procedures. As with the 'fast mode' scan, the shutdown scanner could also save a copy of any executable files, associated with these launch points, into a specified storage location (e.g. a file) in the memory. All of these executables would then be scanned once the computer was subsequently started.

Alternatively, during the scan the shutdown scanner could save a hash of any associated executable files, together with the path of the executable file. Following a subsequent start-up of the computer, the executable files could be located using the saved path, and verified by comparing their hash value with the saved hash value. The executable files would then be scanned by the malware detection unit. For example, the file hash could be checked against a database of legitimate file hash values to determine if the files are legitimate. Any remaining executable files could then be scanned for malware.

Any of the executable files that can no longer be found at the location identified by their saved path, or that have been modified since the hash was calculated, would be treated as suspicious. The anti-virus program would then perform a more in-depth analysis of these suspicious executable files, for example, by scanning the user process memory or executing some anti-rootkit heuristic logic. These 'slow mode' alternatives would be more reliable at detecting malware than the fast mode, but would have greater processing requirements and cause a greater impact on performance.

It will be appreciated by the person of skill in the art that various modifications may be made to the above described embodiments without departing from the scope of the present invention. For example, whilst the embodiment above describes the anti-virus program automatically initiating the deletion of any suspected malware, the anti-virus program could alternatively check if there are any predefined procedures, in the form of a user-definable profile or centrally administered policy, for handling such malware. If there are some predefined procedures, then the anti-virus program will take whatever action is required according to these policies. If there are no predefined procedures, the anti-virus program will prompt the user to select what action they would like to take regarding the suspected malware (e.g. the anti-virus program could request the user's permission to delete the malware or perform some other action to disinfect the computer).

The invention claimed is:

1. A method of operating a computer to detect malware, which malware writes a copy of an executable file to a non-volatile memory of the computer and creates a launch point that causes that executable file to be run at start-up of the computer, the method comprising:

during first shutdown procedures of the computer, detecting the creation and/or modification of any launch points and saving a further copy of any executable file associated with a detected launch point to the non-volatile memory; and following a subsequent start-up of the computer, examining said further copy to determine that said saved further copy is malware, and then initiating second shutdown procedures of the computer; and during the second shutdown procedures, deleting the created and/or modified launch point associated with the executable file and deleting the executable file from the non-volatile memory of the computer.

2. A method as claimed in claim 1, wherein information identifying the associated launch point is saved with each further copy of an executable file.

3. A method as claimed in claim 1, wherein the copy of the executable file is written to a first location in the non-volatile memory and the further copy is saved to a second location in the non-volatile memory.

4. A method as claimed in claim 3, wherein the second location in the non-volatile memory is subsequently accessed by a malware scanner, the malware scanner examining said further copy to determine if it is potential malware.

5. A method as claimed in claim 1, wherein the step of detecting the creation and/or modification of any launch points comprises one or more of:
   monitoring changes to a registry of the computer;
   monitoring modifications to a boot sector of a non-volatile memory of the computer; and
   monitoring the writing of data to files.

6. A method as claimed in claim 1, wherein launch points comprise one or more of:
   an executable file specified under a Run or RunOnce key;
   an executable file specified to run as a system service or device driver;
   an executable file specified to run as a shell;
   an executable file specified to run as a debugger;
   an executable file specified to run as a Winlogon notification package;
   an executable file specified in the start-up folders; and
   an executable file specified to run as a boot-start driver.

7. A method as claimed in claim 1, wherein the step of examining said further copy to determine if it is potential malware comprises one or more of:
   scanning the further copy for a malware signature; and
   performing heuristic analysis of the further copy.

8. A method as claimed in claim 1, and further comprising: determining that an executable file associated with a detected launch point is written to the non-volatile memory during the first shutdown procedures of the computer, and then saving a further copy of the executable file.

9. A method as claimed in claim 1, and further comprising:
   detecting initiation of the first shutdown procedures of the computer.

10. A method as claimed in claim 9, wherein the step of detecting initiation of shutdown procedures of the computer comprises any one of:
    using a user-mode driver to receive a SERVICE_CONTROL_POWEREVENT, a SERVICE_CONTROL_PRESHUTDOWN or a SERVICE_CONTROL_SHUTDOWN message;
    using a kernel-mode driver to receive a IRP_MJ_SHUTDOWN IRP message; or
    using an invisible window to receive a WM_QUIT message.

11. A computer system comprising:
    a processor configured to detect the creation and/or modification of any launch points during first shutdown procedures of the computer system;
    a memory configured to save a copy of any executable file associated with a launch point created and/or modified during the first shutdown procedures; and
    the processor being further configured to examine said copy, following a subsequent start-up of the computer system, in order to determine that said saved further copy of an executable file is malware, and to then initiate second shutdown procedures of the computer; and
    the processor being further configured to, during the second shutdown procedures, delete the created and/or modified launch point associated with the executable file and to delete the executable file from the non-volatile memory of the computer.

12. A non-transitory computer storage medium having stored thereon a computer program comprising computer program code adapted to perform all the steps of claim 1 when said program is run on a computer.

* * * * *